(No Model.)
2 Sheets—Sheet 1.
G. B. BOOMER.
SCREW PRESS.
No. 283,463. Patented Aug. 21, 1883.
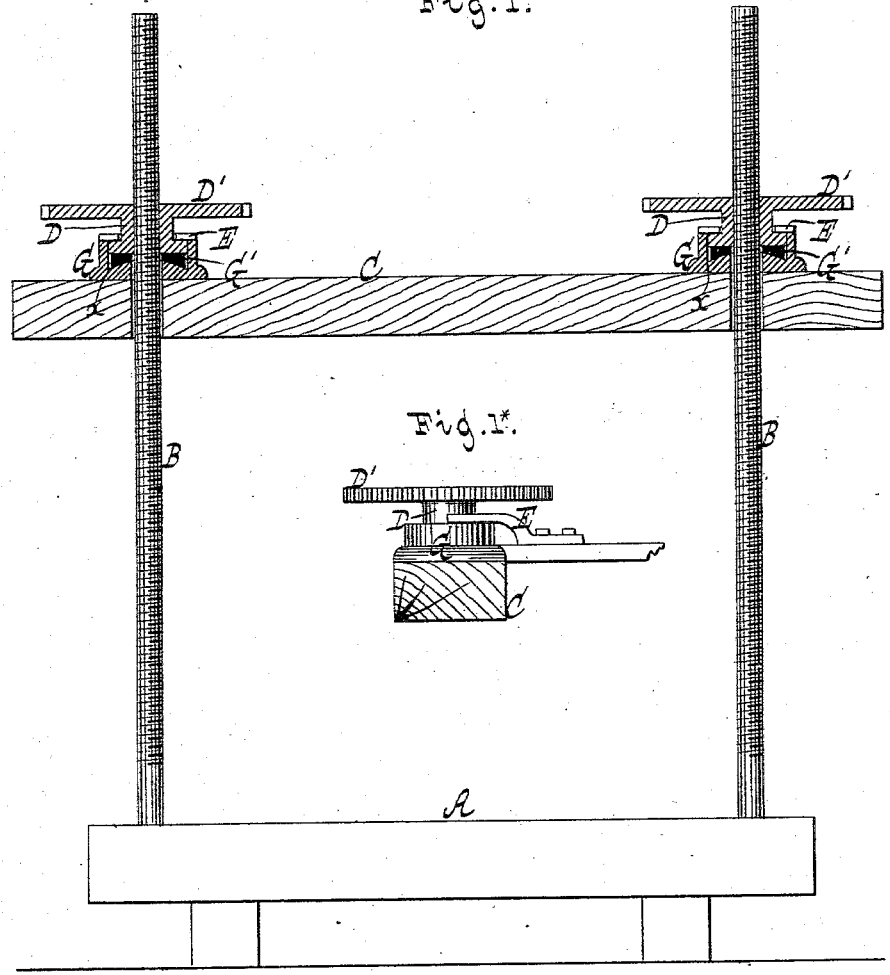
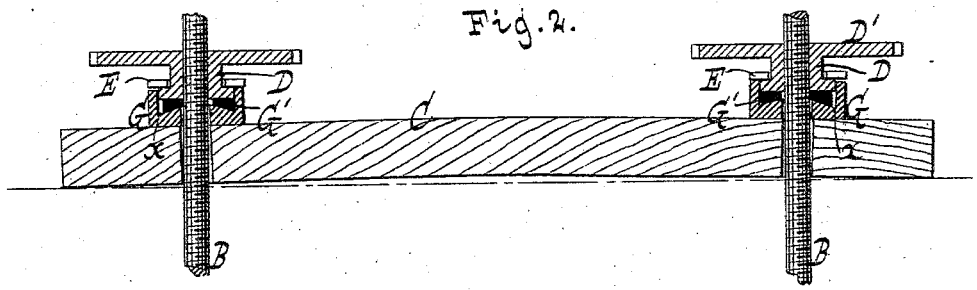
WITNESSES:
Chas. Nahlers.
William Miller
INVENTOR
George B. Boomer
BY Van Santvoord & Hauff
ATTORNEYS.

(No Model.) 2 Sheets—Sheet 2.

G. B. BOOMER.
SCREW PRESS.

No. 283,463. Patented Aug. 21, 1883.

WITNESSES:
Chas. Wahlers
William Miller

INVENTOR
George B. Boomer
BY Van Santvoord & Hauff
ATTORNEYS

UNITED STATES PATENT OFFICE.

GEORGE B. BOOMER, OF TARRYTOWN, NEW YORK.

SCREW-PRESS.

SPECIFICATION forming part of Letters Patent No. 283,463, dated August 21, 1883.

Application filed June 5, 1883. (No model.)

*To all whom it may concern:*

Be it known that I, GEORGE B. BOOMER, a citizen of the United States, residing at Tarrytown, in the county of Westchester and State of New York, have invented new and useful Improvements in Screw-Presses, of which the following is a specification.

This invention relates to presses, and more especially to that class of presses comprising one or more pairs of vertical screws, on which are arranged the beams of the follower, such beams having connected thereto nuts to engage the screws for producing the required motion of the follower. In the operation of such presses the beams are liable to be sprung or deflected from the proper plane, due to the resistance offered to the follower by the material beneath it, and the nuts are caused to bind on the screws, thereby seriously affecting the working of the press. Said beams, moreover, are liable to warp, and thus also cause the nuts to bind on the screws. To overcome these disadvantages I have arranged the nuts to act on the beams through the medium of universal joints, so that they are adapted to preserve the proper relation to the screws without binding thereon.

Figure 3:
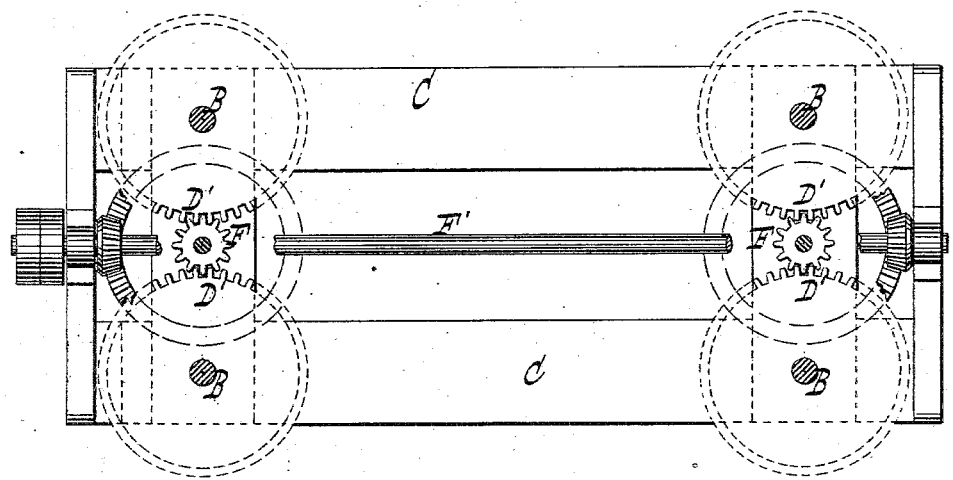
Figure 4:
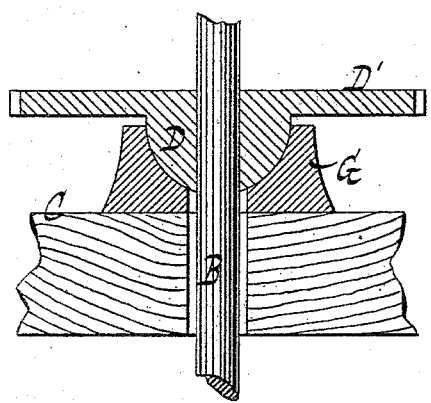
Figure 5:
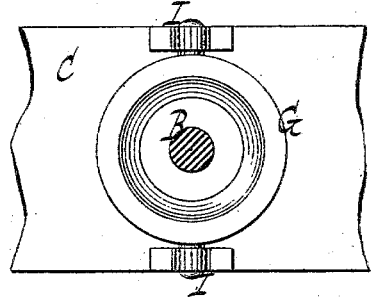
Figure 6:
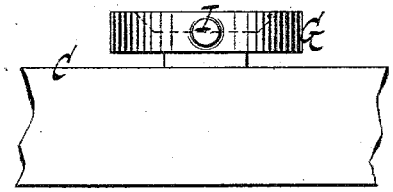

This invention is illustrated in the accompanying drawings, in which Figure 1 represents a sectional side elevation. Fig. 1* is a detail view, showing the manner of connecting the nuts to the beams. Fig. 2 is a like view, showing one of the beams as it appears when sprung upward. Fig. 3 is a horizontal section. Figs. 4, 5, and 6 illustrate modifications of my invention.

Similar letters indicate corresponding parts.

The letter A designates the bed of the press, supporting the vertical screws B B, on which are arranged, in the usual manner, the beams C of the follower, they being provided with holes at or near the opposite ends for the passage of the screws. In the example shown two beams are used, requiring two pairs of screws; but it should be understood that this number of said parts may be varied.

The letter D indicates the nuts of the screws. These nuts are connected to the beams C by forked arms E or other suitable means, and they are geared together in pairs by a pinion, F, Fig. 3, engaging with toothed wheels D' thereon, while the two pinions are geared with a driving-shaft, F', in such a manner that a revolving motion may thence be imparted to the nuts in like directions for lowering or raising the follower.

The letter G indicates washers combined with the nuts D. These washers are fastened to the beams C at the proper points, and in the example shown in Figs. 1 and 2 they are convex on their upper or bearing surfaces, between which and the nuts are interposed loose secondary washers G' of plano-concave form, presenting their flat surfaces to the nuts. Both the fixed washers G and the loose washers G' are provided, respectively, with a central vertical hole for the passage of the proper screw, the hole of the fixed washers coinciding with the proper hole of the beams, but the hole of the loose washers being slightly larger in diameter. When in the descent of the follower the beams C are sprung or deflected, as before explained, the fixed and loose washers G G' adjust themselves, due to the change in the plane of the fixed washers, together with the beams, to allow the nuts D to preserve a true vertical line, as indicated in Fig. 2, and hence the nuts are adapted to turn freely on the screws in any position of the beams without binding.

Each of the fixed washers G is provided with a side wall extending upward outside of the supplementary washers G' and nut D', to resist the tendency of the nut to move laterally when the power is applied to it, and also to retain a lubricating material. When this wall is used a space, $x$, should be provided between it and the loose washer G', to permit the required play of the parts.

The object of the loose washers G' is to relieve the nuts of friction; but, if desired, said washers may be omitted and the nuts arranged to bear directly on the fixed washers G.

It will be seen that the fixed and loose washers G G' form universal joints, they being, in fact, inverted ball-and-socket joints; but such joints can also be produced in other ways—as, for example, by making the fixed washers concave to receive a convex nut—as shown in Fig. 4; or, in lieu of a universal joint, I can use a pivot-joint, which is formed by securing the washers to the beams by trunnions I, as shown in Figs. 5 and 6, and I reserve the right to make this joint the subject-matter of a separate application for Letters Patent.

What I claim as new, and desire to secure by Letters Patent, is—

1. The combination, in a press, of the screws, the beams arranged to move on the screws, the screw-nuts, and the universal joints, whereby the nuts act on the beams, substantially as and for the purpose set forth.

2. The combination, in a press, of the vertical screws, the beams arranged to move on the screws, the screw-nuts, and the convex washers fixed to the beams to receive the nuts, substantially as and for the purpose set forth.

3. The combination, in a press, of the vertical screws, the beams arranged to move on the screws, the screw-nuts, the convex washers fixed to the beams to receive the nuts, and the plano-concave washers interposed loosely between the nuts and the convex washers, substantially as and for the purpose set forth.

In testimony whereof I have hereunto set my hand in the presence of two subscribing witnesses.

GEORGE B. BOOMER.

Witnesses:
W. HAUFF,
CHAS. WAHLERS.